United States Patent [19]

Clark et al.

[11] Patent Number: 4,921,731
[45] Date of Patent: May 1, 1990

[54] DEPOSITION OF CERAMIC COATINGS USING SOL-GEL PROCESSING WITH APPLICATION OF A THERMAL GRADIENT

[75] Inventors: David E. Clark; William J. Dalzell, Jr.; Brenda L. Adams, all of Gainesville, Fla.

[73] Assignee: University of Florida, Gainesville, Fla.

[21] Appl. No.: 45,786

[22] Filed: Apr. 28, 1987

Related U.S. Application Data

[63] Continuation of Ser. No. 841,088, Feb. 25, 1986, abandoned.

[51] Int. Cl.$^5$ ................................. B05D 3/02
[52] U.S. Cl. ........................... 427/314; 427/318; 427/376.3; 427/376.4; 427/397.7; 427/419.2; 427/430.1; 427/435; 427/443.2
[58] Field of Search ............ 427/190, 422, 427, 397.7, 427/376.4, 419.2, 435, 443.2, 430.1, 314, 318, 376.3

[56] References Cited

U.S. PATENT DOCUMENTS

| | | | |
|---|---|---|---|
| 4,231,900 | 11/1980 | Kato et al. | 427/376.2 |
| 4,419,344 | 12/1983 | Crone | 427/435 |
| 4,476,156 | 10/1984 | Brinker et al. | 427/376.2 |
| 4,485,094 | 11/1984 | Pebler et al. | 427/376.2 |
| 4,521,463 | 6/1985 | Powers et al. | 427/435 |

*Primary Examiner*—Janyce Bell
*Attorney, Agent, or Firm*—Fleit, Jacobson, Cohn, Price, Holman & Stern

[57] ABSTRACT

A method of ceramic coating a substrate by thermodeposition from a sol made by hydrolyzing and peptizing organometallic compounds in water. The sol contains colloidal particles having a size between about 0.0005 micron and about 10 microns and the deposited coatings have good packing characteristics as well as smoothness. Composite coatings are also deposited which contain reinforcing materials such as SiC embedded in the coated matrix. These coatings afford the substrate onto which they are coated excellent wear, anti-corrosion and insulating characteristics.

8 Claims, No Drawings

DEPOSITION OF CERAMIC COATINGS USING SOL-GEL PROCESSING WITH APPLICATION OF A THERMAL GRADIENT

BACKGROUND OF THE INVENTION

This invention was made with Government support under F49620-83-C-0072 awarded by the Air Force. The Government has certain rights in this invention.

This application is a continuation of 06/841,088 filed Feb. 25, 1986, now abandoned.

1. Field of the Invention

This invention relates generally to the subject matter of ceramic coating. More particularly, it relates to the deposition of sol-gels (sols) to form ceramic materials such as alumina, silica, zirconia, titania, lanthania, hafnia, tantalum oxide thoria, urania, germania and magnesia by means of thermophoresis. The thermophoretic method of the present invention is a simple process for attaining a single or multiple layered coating on a substrate which avoids the costly steps of initial firing and grinding required by prior processes. The method of the present invention produces densely packed coatings having excellent anti-corrosion, wear resistance and insulating characteristics.

2. Description of the Background

The advantage is well known in materials science to have surface properties that differ from those of the bulk of an article's body. These properties may be of a varied nature, including increased toughness, as well as, high temperature, wear and corrosion resistance. To attain these goals, the entire structure of the article may be built utilizing an exotic material having the desired surface properties or a lower cost article body may be provided with a coating having the desired properties.

Traditionally, ceramic coatings were deposited from a slurry made up of a powder in a suspension medium. The particle size of these powders is limited to approximately 1 micron if ground by ball milling (Van Vlack (I), L. H., Physical Ceramics for Eng., Addison-Wesley Pub. Co., 238-234 (1964)). Particles made through chemical synthesis such as the reduction of bauxite with sodium hydroxide in the Bayer process can have particle sizes of somewhat less than 1 micron, but no less than 0.1 micron (Van Vlack, in Phys. Cerams. for Engs., Addison-Wesley Pub. Co., pp. 234-238 (1964)). Methods for the formation of smaller particles have not been available or utilized in the deposition of ceramics. Accordingly, the quality of the coatings obtained up to the present time has been limited in terms of the attainable packing characteristics.

Sol-gel technology involves the preparation of ceramics and glasses by low temperature hydrolysis and peptization of metal oxide precursors (organometallic compounds) in solution, instead of sintering compressed powders at high temperatures. For example, aluminum hydroxide sol, after gelling, becomes alumina upon firing above 600° C.

By 1975, alumina was being synthesized by sol-gel techniques with aluminum sec-butoxide as its metal oxide precursor (Yoldas, B. E.(I), "Alumina Sol Prep. from Alkoxides", Amer. Ceram. Soc. Bull. 54(3):289-290 (1975); Yoldas, B. E. (II), "A Transparent Porous Alumina", Amer. Ceram. Soc. Bull. 54(3):286-288 (1975); Yoldas, B. E. (III), "Alumina Gels That Form Porous Transparent $Al_2O_3$", J. Mater. Sci. 10:1856-1860 (1975)). According to Yoldas (I), supra, the process of making alumina involves four basic steps:

(1) hydrolysis of aluminum alkoxides,
(2) peptization of the hydroxide to a sol,
(3) gel formation, and
(4) pyrolysis of the dried gel to alumina.

In the Yoldas(I) process, the hydrolysis of the aluminum alkoxide precursor is conducted with an excess of water in a ratio of 100 moles of water per mole of Al-$(OC_4H_9)_3$, and the peptization proceeds at 90° C. with 0.07 moles of acid per mole of precursor. The peptized sol is then gelled and dried, and the resulting dried samples are calcined at 1200° C., the temperature of formation of alpha-$Al_2O_3$. According to Yoldas (II), supra, alpha-alumina is the only stable phase above 1150° C.

The sol-gels are prepared by a chemical synthesis method which results in a particle size limit reduced by an order of magnitude to approximately 0.1 micron or less when compared with traditional ball milling. According to the present invention, a method is provided utilizing the principle of thermophoresis which is that the movement of suspended particles through a fluid may be effected as a result of the influence of an applied thermal gradient. According to the invention, deposition onto a substrate is effected from a sol suitably prepared from an organometallic compound. This results in the compaction and adherence of the particles onto the surface of the substrate kept at a temperature differential from the particles in suspension and coatings onto substrates are achieved. The smaller particles thus deposited have more intimate contact with the surface and can thereby form a better and more continuous coating, thereby rendering sol-gel technology a way of providing superior deposition suspensions. Furthermore, sol-gel processing may be conducted for a wide range of ceramic materials, such as alumina, silica, zirconia, titania, hafnia, thoria, lanthania, urania, magnesia, germania, and tantalum oxide, and coatings can be achieved that are otherwise difficult to apply or impossible by other methods.

In a co-filed co-pending application entitled "Electrodeposition of Ceramic Coatings Using Sol-Gel Processing and Compositions Thereof", the present inventors describe a novel method of depositing a ceramics coating on a substrate comprising the electrophoretic deposition from sols of the type utilized herein.

In another co-filed co-pending Application entitled "Inorganic Salts as Peptizing Agents in the Preparation of Metal Oxide Sol-Gel Compositions", the present inventors describe novel sols and sol-gel compositions, methods of preparing same and methods of obtaining monoliths, bodies, and coatings. This co-filed, co-pending Application describes the preferred techniques for making the sols and sol-gels.

Accordingly, there still remains a need for an improved method of depositing ceramic coatings having particle sizes in the submicron range onto a substrate affording increased toughness and superior resistance to wear temperature and corrosion.

SUMMARY OF THE INVENTION

The present invention provides a method for thermophoretically depositing a ceramic coating onto a substrate, comprising:

(a) hydrolyzing and peptizing an organometallic compound selected from the group consisting of aluminum, silicon, hafnium, lanthanum, titanium, magnesium, thorium, uranium, tantalum, germanium, and zirconium alkoxides; organo orthosilicates and mixtures thereof in the presence of an aqueous medium comprising water or a mixture thereof with an organic solvent in the presence of preferably an inorganic salt or an acid selected from the group consisting of organic and inorganic acids, wherein the pH of the medium is adjusted to between about 0.01 and about 7; the amount of said organometallic compound and the ratio of said solvent to water being present in a proportion and said hydrolysis and peptization being conducted at a temperature and for a time effective to obtain a sol, the solid phase of which is composed of colloidal particles having a particle size of between about 0.0005 micron and about 10 microns. Whereas the pH is preferably acid, it may be basic through the use of appropriate bases such as NaOH, KOH etc.;

(b) partially reducing the volume of said aqueous medium of said sol (dewatering);

(c) depositing particles from said dewatered sol onto the surface of the substrate by immersing said substrate into said medium for a period of time effective to deposit a desired thickness of said coating; the substrate and the medium having a temperature differential of between about 10° C. and about 1500° C. at the time of immersion;

(d) removing said coated substrate from said medium; and (e) allowing said coated substrate to dry; wherein steps (c) through (e) are performed at least once.

In a separate embodiment of this invention, the particles in the sol in step (c) are deposited by spraying the sol onto the surface of said substrate.

Also provided herein is a method for the continuous production of a ceramic coated elongated strip, which comprises:

(a) continuously passing successive portions of an elongated strip through a thermophoretic chamber containing a thermophoretic medium comprising a sol containing between about 0.01 wt. % and about 99 wt. % of an organometallic compound selected from the group consisting of aluminum, silicon, hafnium, uranium, lanthanum, titanium, thorium, magnesium, germanium, tantalum and zirconium alkoxides, organo orthosilicates and mixtures thereof which have been hydrolyzed and peptized to produce particles in the sol having a particle size of between about 0.005 and about 10 microns; between about 0.01 wt. % and about 99 wt. % of an aqueous medium comprising water or a mixture thereof with an organic solvent as the major portion of the aqueous phase, and preferably an inorganic salt or acid selected from the group consisting of organic and inorganic acids whereby, the pH of the medium is adjusted to between about 0.01 and about 7; said aqueous composition being continuously agitated or circulated through the chamber;

(b) maintaining a temperature differential between said strip and said medium of between about 10° C. and about 1500° C.; whereby ceramic coating particles are continuously deposited on the surface of the strip; and (c) allowing the said coated strip to dry when it has emerged from the chamber.

In another embodiment of this invention, a method of depositing a ceramic coating on a substrate, comprises:

(a) thermophoretically depositing particles from a thermocoating medium comprising a sol obtained by admixing an amount of an organometallic compound, with an aqueous medium comprising water or a mixture thereof with an organic solvent, in amounts effective to hydrolyze and peptize the organometallic compound to obtain a sol, mixing a reinforcement particulate material into the sol, and depositing particles onto the surface of said substrate by immersing the substrate into said medium for a period of time effective to deposit a desired thickness of a composite coating; the substrate and the medium being maintained at a temperature differential of between about 10° C. and about 1500° C. at the time of immersion;

(b) removing said coated substrate from said medium; and (c) allowing said coated substrate to dry.

This invention contemplates the reinforcement particulate being in the form of a powder, whiskers, fibers, shavings, colloids, platelets, fines, ultrafines, or mixtures thereof. The reinforcement may comprise materials, such as carbon, metal oxides, metal nitrides, silicon nitride, metal carbides such as silicon carbide, carbons, metal powders, and mixtures thereof which afford the coating increased toughness and resistance to wear, chipping and cracking.

The ceramic coatings of the this invention attain superior toughness and provide the coated article with superior insulation and resistance to wear and corrosion. Further, multiple lamellar coatings in the presence or absence of reinforcement particulates can be applied onto a substrate before any heating is applied to the coating to convert it to the ceramic oxide form.

Having generally described the invention, a more complete understanding can be obtained by reference to the drawings which are provided herein for purposes of illustration only, and are not intended to be limiting unless otherwise specified.

BRIEF DESCRIPTION OF THE DRAWINGS

FIGS. 1 and 2 depict apparatus for carrying out thermophoresis coating according to the invention and a thermophoresis cell, respectively.

FIG. 3 depicts substrate-sol contact in the thermophoresis cell.

Other objects, advantages and features of the present invention will become apparent to those skilled in the art from the following discussion.

DETAILED DESCRIPTION OF THE PREFERRED EMBODIMENTS

An interest in further advancing the art of ceramic coatings to provide better electrical, thermal, wear and corrosive protection prompted the present invention which provides an improved, novel and commercially useful method of depositing ceramic materials on metallic and non-metallic surfaces. This successful innovation and perfection, for the first time, of a method of utilizing sol-gel technology for applying a ceramic coating characterized by particles of substantially smaller particle sizes onto the surface of a substrate, now opens the possibility of using synthetically derived sol-gel compositions to obtain improved anti-corrosion, wear resisting and insulating properties in catalytic converters, ornamental objects, kitchenware, electrical articles, refractories, fiber optics, marine equipment, materials designed for use in space, and the like. The use of ceramic coatings having superior packing characteristics as taught by the present invention for the inhibition or retardation of corrosion, improving wear resistance, and improving electrical insulation and thermal conductivity has heretofore been unknown in the art.

The present invention arose from the concept of utilizing sol-gel technology to obtain extremely fine colloidal particles and to permit easy application of an adherent film to a substrate, with the resultant coating being uniformly and tightly packed. Any surface flaw in the substrate will be filled by the coating due to the inherently fine particle size of the colloidal particles in the sol and the attraction force induced by an applied thermal gradient. The utilization of sol-gel technology simplifies the process of coating by avoiding the costly initial steps of firing and grinding required for ceramic enamelling. Further, the possibility of adapting sol-gel technology to the deposition of fine particles by a simple means such as a thermal gradient between the colloidal suspension and the object to be coated is a further significant advantage of the present invention.

Accordingly, the present invention affords a substantial control of the packing density of the ceramic particles making up the coatings deposited on metallic or non-metallic substrates. The coatings may be composed of metal oxide or may have included reinforcement particulates to form composite coatings. The reinforcement may be in the form of powders, shavings, whiskers, colloids, platelets, fines, ultrafines, fibers or mixtures thereof, and may be added to the sol prior to depositing the coating.

This invention provides for the coating of bodies by thin films deposited from metal hydroxide sols by thermal gradients or differentials (thermophoresis). A metallic hydroxide sol may be produced by hydrolysis and peptization of a variety of organometallic compounds. The sol then may be brought to the point when it would normally be cast for gellation by partially dewatering, such as removing about 75% 5 of the water. A composite sol can be formed by adding a desired volume fraction of a reinforcement in the form of a powder, whiskers, shavings, fines, ultrafines, colloids, platelets or fibers. The sol is then heated and stirred to a desired temperature within the range described hereinbelow and a cooler substrate is then dipped into the bath for an amount of time sufficient to form a film of a desired thickness. This process is called positive thermophoresis. The converse situation, where the substrate is provided at a higher temperature and the medium is maintained at a lower temperature is called negative thermophoresis.

The thickness of a coating can be expressed as a function of sol concentration, viscosity and the speed at which the substrate is withdrawn (Dislich and Hussmann, "Amorphous and Crystalline Dip Coating obtained from Organometallic Solutions: Procedures, Chemical Processes and Products", Thin Solid Films 77:129–139 (1981)). Specifically, the amount of liquid adhering to a solid moving substrate behind a receding meniscous is given by the following relationship between thickness of a layer (t), the speed of the moving substrate (U), the viscosity of the liquid (n), gravitational acceleration (g), the density of the sol (p) (Deryagin, B., Rabinovich, Storozhilova, A., Sheherbing, G., "Measurement of the Coefficient of Thermal Slip of Gases and the Thermophoresis Velocity of Large-Size Aerosol Particles", J. Colloid Interface Sci 57:451–461 (1976)).

$$t = \tfrac{2}{3}\left(\frac{un}{pg}\sin\alpha\right)^{\tfrac{1}{2}} \quad (1)$$

where $\alpha$ is the angle between the horizontal plane and the tangent at the point of substrate liquid contact (FIG. 3).

The basic mechanism of thermophoresis relies on the fact that a particle suspended in a temperature gradient experiences a net force in the direction of decreasing temperature (positive thermophoresis). This force arises from the different average velocities the molecules impacting on opposite sides of the particle have due to the temperature gradient. It has been postulated that very small particles (like those found in a sol) can be regarded as large inert molecules and that, therefore, their thermal migration in a highly dispersed suspension, as in a sol, is a limiting case of molecular thermal diffusion. The thermophoretic velocity acquired in the media in the direction of decreasing temperature gradient, $\Delta T$, is given by the general equation:

$$V_T = -k(n/T)\Delta T \quad (2)$$

where
T is the temperature of the sol,
$\eta$ is the kinematic viscosity of the sol, and
k is a constant depending on the molecular flow regime.

A measure of this regime is the ratio of mean free path length $\lambda$ of the liquid to the radius of the particle referenced above $R_p$, for $R_p \gg \lambda$, (Mason, E. A., Chapman S., Journal of Chem. & Phys. 36:627 (1962); Walker, K. L. et al, "Thermophoretic Deposition of Small Particles in Modified CVD Process", Amer. Ceram. Soc. J. 63:552–558 (1980); Mason, E. A. and Chapman, S., J. Chem. Phys. 36:627 (1962)).

The two predominant forces in thermophoretic/dip coating, namely, the viscosity withdrawal represented by equation 1 and the thermophoretic velocity of equation 2, contribute to form adherent coatings on substrates. If a sufficient thermal gradient exists, such as that depicted in FIG. 5, a fine film 1-5 $\mu$m is deposited onto the substrate by thermophoresis. Such a coating can be seen in SEM micrographs. A second coating, about 30 $\mu$m thick, forms on this coating by the viscosity withdrawal effect expressed by equation 1, supra. This second coating adheres well to the thermophoretic coat. Using the same thermal gradient, successive coatings can be produced utilizing the viscosity withdrawal effect. Further thermophoretic-like layers may be obtained by increasing the thermal gradient before each successive thermophoretic dipping.

A wide range of substrates both metallic and non-metallic can be coated by the present method and compositions. Examples of the materials which compose the substrates are aluminum, steels, fecralloy, carbon/carbon composites, glass, ceramics, nickel, brass, unalloyed cast iron, monel, PMMA, plastic metals, optical fibers, refractories, and superalloys such as inconel.

Articles of innumerable forms and sizes can be coated by the present process. The processes and compositions of this invention are particularly applicable to the coating of sheets, filaments, ribbons, strips, wires, rods or shaped articles. In the the case of shaped articles, a particular advantage of the processes is that a uniform deposit of the coating is obtained.

The coatings of this invention can be produced from sol systems of a variety of organometallic compounds. Preferred are coatings of alumina, silica, zirconia, hafnia, lanthania, thoria, titania, urania, magnesia, germania and tantalum oxide or mixtures thereof.

The metallic hydroxide sols may be prepared by hydrolysis and peptization of organometallic compounds in an aqueous medium. Preferred precursors are metal alkoxides, and organo orthosilicates. Preferred among these are metal tertiary alkoxides, organo orthosilicates, metal ethoxides, metal methoxides, metal propoxides, and mixtures thereof. Still preferred among the precursors are aluminum sec-butoxide, metal tetraethylorthosilicate, zirconium-n propoxides, hafnium alkoxides and mixtures thereof. The chemical reactions believed to occur during sol preparation are depicted hereinbelow in Scheme I as reported by Yoldas(II), supra, and exemplified for alumina.

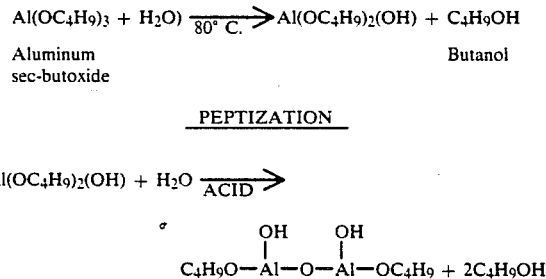

Scheme I: $Al_2O_3$ Sol Formation Reactions
HYDROLYSIS $Al(OC_4H_9)_3 + H_2O \xrightarrow{80° C.} Al(OC_4H_9)_2(OH) + C_4H_9OH$ Aluminum sec-butoxide    Butanol

PEPTIZATION $Al(OC_4H_9)_2(OH) + H_2O \xrightarrow{ACID}$ $C_4H_9O-\underset{\underset{OH}{|}}{Al}-O-\underset{\underset{OH}{|}}{Al}-OC_4H_9 + 2C_4H_9OH$ According to this scheme, the resulting sol is composed, in the exemplified case, of aluminum monohydroxide colloidal particles approximately 100 Å in diameter which are suspended in a water-alcohol medium corresponding to the alkoxide utilized. In general, the sol is composed of the corresponding metal monohydroxide.

Sols can be prepared with a wide range of compositions capable of forming ceramic coatings which include alumina, zirconia, hafnia, lanthania, urania, titania, thoria, tantalum oxide, germania, silica and mixtures thereof. A preferred amount of organometallic compound utilized in a sol is between about 0.01 wt. % and about 50 wt. % of the sol. A still more preferred amount is between about 0.1 wt. % and about 40 wt. %, and still a more preferred amount is between about 1 wt. % and about 30 wt. %.

A preferred range of particle sizes for the colloidal particles is between about 0.0005 micron and about 10 microns, and still more preferable are particle sizes of between about 0.005 micron and about 1 micron. The best results are obtained with a range of particle sizes of between about 0.001 micron and about 0.1 micron. A more intimate contact of the coating materials with the substrate surface is attained within these ranges of particle sizes which permits the formation of a more continuous coating. This enables the coatings of the present invention to have excellent adhesion and smooth appearance, as well as a tight sealing capability, thus providing superior wear resistant, anti-corrosive and insulating coatings.

The hydrolysis and peptization steps may be carried out within a broad range of temperatures. A preferred range is between about 10° C. and about 150° C., still more preferred is a range of between about 40° C. and about 130° C., and even more preferred is a range of between about 60° C. and about 100° C. The most preferred temperature for the use of aluminum sec-butoxide is about 80° C. The length of time for these reactions may be varied in accordance with the temperature and proportion of the components in the composition, particularly the amount of water and organic solvent present. For instance, the higher the temperature, the shorter the time required to attain a desired sol. Preferred times for the hydrolysis and peptization steps are between about 1 sec. and about 288 hrs., preferably between about 5 sec. and about 240 hrs., and still more preferably between about 10 sec. and about 24 hours.

The amount of water in the aqueous medium may be broadly varied in accordance with the rest of the parameters. Preferred amounts of water are between about 1 wt % and about 99 wt % of the composition, still more preferred are amounts between about 30 wt % and about 60 wt %, and yet more preferred are amounts between about 30% and about 50 wt %. The pH of the aqueous medium is preferably maintained between about 0.01 and about 7, preferably between about 3 and about 6, and more preferably between about 4 and about 5. When water-solvent mixtures are utilized, the water-solvent ratio may be between about 10,000:1 and about 2:1. A more preferred ratio of water:solvent is between about 1000:1 and about 2:1. Still more preferred is a ratio of between about 100:1 and 2:1.

A preferred embodiment of the present process encompasses the utilization of a water-solvent medium for the hydrolysis and peptization step. A specific group of preferred organic solvents are organic alcohols, aldehydes, ketones, organic acids and mixtures thereof. Still more preferred organic solvents for use in the present process are those having, in addition, low viscosity, low evaporation rate, low electrical conductivity and low cost. Examples of organic solvents meeting these requirements and suitable for use in the present process are methyl alcohol, ethyl alcohol, denatured ethyl alcohol, isopropanol and acetone.

The proportion of organometallic compound to aqueous medium may be between about 1:10,000 and about 1:2, preferably between about 1:1,000 and about 1:2. The best results are obtained with a ratio of organometallic compound:aqueous medium of between about 1:300 and about 1:2.

The materials suitable for use in the hydrolysis and peptization step are organic and inorganic acids and inorganic salts. Preferred are acids having dissociation constants of between about $2.2 \times 10^{13}$ and about $9 \times 10^{-1}$, more preferably between about $2 \times 10^{-8}$ and about $5 \times 10^{-1}$, and still more preferably between about $1,76 \times 10^{-5}$ and about $2 \times 10^{-1}$. Most preferred for use in this invention are the inorganic salts described in co-pending Application entitled "Inorganic Salts as Peptizing Agents in the Preparation Metal Oxide Sol-Gel Compositions" but in addition, one may use hydrochloric acid, sulfuric acid, acetic acid, nitric acid, tricloroacetic, aqua regia. The preferred inorganic salts include metal nitrates, metal sulfates, metal sulfides and metal chlorides. The nitrates are most preferred. The metal may be Al, Zr, Ti, Hf, La, Cr, Ta, Si, Mg, Yt, Co, Ni, Fe, Ge, Rh, Rb and Ba. The ratio of peptizing agent to organometallic compound varies from about 1:1 to about 0.001:1.

The volume of the aqueous sol is preferably reduced. The volume reduction may be accomplished by a variety of methods, including evaporation, boiling and selective permeation of the liquid, among others. These processes can be carried out within a broad range of temperatures. Preferred temperatures are between about 0° C. and about 500° C. A more preferred range of temperatures is between about 15° C. and about 200° C., and still more preferred is between about and including 50° C. and about and including 110° C.

Reinforcing materials can be added to the sol to form composites and for toughening and strengthening the coatings and reducing mechanical damage thereto, thereby minimizing the amount of wear, chipping or cracking. Preferred reinforcement can be metal powders, metal oxides, metal nitrides, silicon nitride, metal carbides, carbon and mixtures thereof. Reinforcement is preferably in the form of colloids, whiskers, particles, fines, ultrafines, powders and mixtures thereof. The reinforcement is added preferably after reducing the volume of liquid but may be added to the initial sol or during the thermodeposition step.

The sol may be stored prior to its use. The sol is stable for about 9 months and perhaps years at a temperature of between about 5° C. and about 35° C. At room temperature its stability has been observed for up to about 10 months. At lower temperatures it may be safely stored for longer periods of time.

The partially dewatered sol is obtained by reducing the volume of water of the initial sol to between about 10 wt. % and about 90 wt. % (provided gellation does not occur), preferably to between about 30 wt. % and about 80 wt. %, and still more preferably to between about 50 wt. % and about 70 wt. %. The corresponding sol may be adjusted at a later time by adding an aqueous medium comprising between about 20% and about 90% of deionized water, preferably between about 30% and about 80%, and more preferably between about 40% and about 60%, or a mixture thereof with an organic solvent having the characteristics described supra to the desired volume.

The proportion of water in the thermophoretic bath is preferably from between about 20 wt. % to about 90 wt. % of the medium. A still preferred range is between about 30 wt. % and about 60 wt. %. The amount of water in the bath is more advantageously between about 40 wt. % and about 50 wt. %.

The thermocoating medium comprises water and/or, solvent and organometallic in a proportion of between about 1000:1 and about 10:1, more preferably between about 100:1 and about 10:1. However other proportions are also contemplated as suitable.

The present process can be utilized as a batch process (discontinuous process) or a continuous process. A particular aspect of the continuous production of a ceramic coated strip or wire will be appreciated from the relationship existing between the relative velocity with which the thermophoretic medium and the substrate surface move with respect to each other. The higher the relative velocity, the higher the limiting temperature differential needed for the formation of acceptable coatings, and vice versa. In practice, this means that if the process is carried out discontinuously, that is if the surface to be coated is held stationary within the bath, and the bath is agitated sufficiently to maintain the coating particles in suspension, the temperature differentials required are lower, preferably in the range of between about 10° C. and about 1,500° C., more preferably between about 50° C. and about 500° C., and still more preferably between about 100° C. and about 400° C. Preferably, the maximum temperature differential is about 1,500° C.

On the other hand, if the process is carried out continuously on an elongated surface in the form of a strip or wire which is continuously passed through the bath while maintained at a set temperature, and the medium is itself agitated or circulated through the bath, for example by being discharged at the top and pumped in from the bottom of the bath, temperature differentials greatly in excess of about 500° C. may be utilized. Preferred is a temperature differential between about 1500° C. and about 1° C., more preferable between about 700° C. and about 50° C., and still more preferable is a temperature differential of between about 500° C. and about 100° C. It will be appreciated from the hereinabove description that the higher the strip speeds and the higher the pumping rates, the higher temperature differentials that may be used.

The present coatings may be deposited on the surface of the substrate as a coating of varying thickness. Coatings having a thickness of between about 0.001 micron and about 100 microns are envisioned, preferably between about 0.01 micron and about 10 microns, and more preferably between about 0.1 micron and about 1 micron. A broad variation in the thickness of the coatings may be obtained by varying the contact time for the thermophoretic step, the concentration of the sol and the deposition time for the thermophoretic step. A preferred deposition time is between about 0.1 sec and about 100 min, more preferred is a range of between about 1 sec and about 10 min, and still more preferred between about 3 sec and about 1 min., although the dipping time may be adjusted in relation to the other parameters of the step. The deposition time is to be adjusted in conjunction with the concentration of the sol and the temperature differential between the medium and the substrate for each particular application.

The thermophoretic medium may be circulated during the thermophoresis step or it may be agitated in order to maintain a constant composition at the contact points between the colloidal suspension and the surface of the article to be coated. Preferred are mild agitation or a slow circulation flow. A particularly useful means of agitation is ultrasound.

One embodiment of the present invention, consists of a process achieved by dipping a substrate into a bath comprising a sol of this invention either continuously or discontinuously, both described supra.

Another embodiment of this invention contemplates the spraying of a sol made from an organometallic compound onto the surface of a substrate while maintaining the substrated and the sprayed material at a temperature differential to cause thermophoretic deposition to occur. The spraying of a chilled sol onto a heated substrate or a heated sol onto a chilled substrate are contemplated by this invention. The temperature ranges envisioned are the same as those described herein for the dipping step.

In one embodiment of the present invention (negative thermophoresis), the proper temperature differential is achieved by heating the substrate to a suitable higher temperature of between about 10° C. and about 1,500° C., preferably between about 50° C. and about 500° C., and still more preferably between about 100° C. and about 300° C., and dipping it into a sol bath cooled to a temperature of between about −40° C. and about 40° C., preferably between about −15° C. and about 30° C., and most preferably between about 0° C. and about 20° C.

In still another embodiment of this invention (positive thermophoresis), the proper temperature differential is achieved by cooling the substrate to a temperature between about −200° C. and about 25° C., preferably between about −100° C. and about 0° C., and still more preferably between about −80° C. and about −60° C., and heating the sol bath to a temperature of between about 5° C. and about 105° C., preferably between about 15° C. and about 95° C., and still more preferably between about 60° C. and about 90° C.

All temperatures within the stated ranges are possible and specific combinations of temperatures are determined by the specific temperature differentials indicated infra. At all times, the temperature differential between the substrate and the sol medium must be maintained at between about 1° C. and about 500° C., preferably between about 10° C. and about 400° C., and most preferably between about 100° C. and about 300° C.

One possible thermophoresis coating apparatus designed to dip a substrate and maintain a constant sol temperature is depicted in FIG. 1. The apparatus consists of a thermostat-controlled system provided with an automatic and variable magnet stirring mechanism 10 for agitating the thermophoretic medium 12 in cell 34 held within chilled bath container 36. Cell 34 is shown schematically in FIG. 2. The apparatus may be provided with an automatic dipping arm 16 of variable time interval, and a timer and on/off relay switch 14 to operate the discontinuous process. The arm 16 consists of reversible motor 18 driving through reduction gears 20, pulleys 22, 24 and belt 26 to raise and lower wire 28 which holds substrate 30 at its end. Heater 32 cooperates to heat sample 30.

To practice the continuous process, a similar apparatus can be used but having the added capability for continuously moving a strip or a wire through the sol medium. In a further particular embodiment, the thermophoresis apparatus has the capability of circulating the sol medium containing the metal hydroxide while maintaining the sol at a constant temperature as it contacts the substrate.

Single or multiple coatings may be deposited on a substrate according to this invention. After a desired number of coatings, each ranging from between about 0.001 micron and about 1 mm. preferably between about 0.01 micron and about 0.1 mm. and more preferably between about 0.1 micron and about 10 microns, are applied to a substrate, the substrate can be left to air dry. Preferably, each coating is air dried as it is deposited. The result is a fine, evenly-distributed coating over the entire dipped or sprayed area.

The dried substrates can then be fired to their limiting temperature, which varies in accordance with the substrate material (e.g., for 6160 T6 aluminum to about 500° C.). As already indicated, the substrates coated by this invention include aluminum alloys, glass, ceramics, brass, nickel, irons, carbon/carbon composites, PMMA, optic fibers, silicon carbide, steel and superalloys. However, any substrate known to accept a ceramic, enamel or metallic coating is within the contemplation of this invention.

In still another embodiment of this invention, composite coatings may be deposited on a substrate. Examples of a composite coating formed by this invention are those where the sol medium contains a reinforcement capable of strengthening the coating, such as, metal carbides such as silicon carbide, metal nitrides, silicon nitride, carbon, metal powders and mixtures thereof, in the form of a powder, fibers, shavings, colloids, fines, platelets, ultrafines or whiskers. If necessary, the reinforcement may be kept in suspension by constant stirring or ultrasound. Preferred among these materials are silicon carbide, carbon fibers, silicon nitride, hafnium carbide and thorium carbide.

The amount of reinforcement which may be added to the medium is between about 1 wt. % to about 90 wt. % of the sol, preferably between about 10 wt. % and about 70 wt. %, and most preferably between about 20 wt. % and about 40 wt. %.

The invention having been generally described, reference is now made to examples which are provided herein for purposes of illustration only, and are not intended to be limiting unless otherwise specified.

EXAMPLES

Example 1:

A thermal gradient was set up between samples and a coating bath composed of an aluminum hydroxide sol obtained by hydrolyzing and peptizing aluminum sec-butoxide. The samples were heated to temperatures between −70° C. and about 350° C. and at each temperature immersed for 1-5 cycles into the bath held at 24° C. Also, samples were cooled to a temperature of about −60° C. and immersed for 1-5 cycles into the bath held at temperatures between −10° C. and about 95° C. Lamellar coatings were formed on the samples. Each sample was heated to a temperature as indicated prior to dipping, held in the sol for 10 seconds and then, air-dried at room temperature. Table 1 shows the conditions of the test.

TABLE 1

| Thermophoresis Conditions for Example 1 | |
|---|---|
| Variables | Conditions |
| temperature range of sol-gel medium | −10° C. to 95° C. |
| temperature range of substrate | −70° C. to 350° C. |
| methanol-base pH | 1–1.5 |
| water-base pH | 3.5–4.0 |
| sol-base | methanol, water |
| sol-type | alumina sol |
| control | ambient substrate |
| number of coats | 1 to 5 |
| substrates used | Al 6061 T6, Fecralloy, glass |
| sol concentration | 25 to 1, 100 to 1 (mole water:mole alkoxide) |

The water-based sol used had a pH of 4 and molar alkoxide:water ratios of 1:100 and 1:25. The methanol-based sol had a pH of about 1 an an alkoxide:water ratio of 1:3.

The solution used for thermophoresis was a 75% reduced by volume water-based aluminum hydroxide solution having a pH of 4 and a 8% $Al_2O_3$ content by volume. The coatings produced by thermophoresis on previously polished fecralloy and aluminum (circularly polished with 600 grit SiC pads) and glass were continuous surfaces, the only discontinuities existed over the rough cut (non-polished) sections of the metal samples. Each coating was approximately 30 microns in thickness and adhered well to the previous coating.

Similar coating kinetics have been observed by Mukherjee, S., "Deposition of Transparent Noncrystalline Metal Oxide Coatings by the Sol-Gel Process", Better Ceram. through Chem., Vol. 32, Chapter 14:178–187, Elsevier Sci. Pub. Co. (1984)). However, in this Example, the first coating formed at the aluminum surface was much thinner (1–5 $\mu$m) and appeared SEM (scanning electron microscopy) transparent at 10,000× amplification. The polished surface of the aluminum was visible through this coating. Subsequent coatings covered the polishing lines. The microstructure of an individual fracture layer showed good distribution of uniform aggregates of aluminum hydroxide colloids approximately 0.05 microns in diameter. Each aggregate contained 10 to 15 colloidal particles.

A 6061 T6 aluminum sample dip-coated in sol was covered with an aluminum hydroxide film as indicated by a FT-IR spectrum.

Example 2:

Example 1 was repeated using only glass substrates in order to eliminate any interferences of the substrate peaks. The lack of interference was verified by SEM micrographs and FT-IR spectra of the coatings on the glass substrate. Coatings were deposited on the substrates which evidenced good adherence.

Example 3:

Further experiments were performed using a methanol-base sol. This sol produced somewhat discontinuous coatings on both fecralloy and aluminum. The low pH of the methanol sol caused some corrosion to occur on the fecralloy substrate. Furthermore, high negative gradients (heated substrate) caused uncontrolled volatilization of the methanol. Accordingly, the methanol-based sol is not a preferred coating with highly negative gradient thermophoresis.

The thermophoresis set up imposed a thermogradient restriction of 45° C. originally. This was due in part to a local gelation-boiling point starting at 70° C. and having no cooling unit attached thereto. This problem was overcome by using a flowing sol bath and by installing a cooling trap. Thermogradients of up to 200° C. were then obtained. Some blistering and pealing was observed when the substrate was heated due in part to a difference in composition of the aluminum hydroxide between the coating and the substrate, as well as local boiling of the sol on the reheated substrated. This problem can be overcome or greatly reduced by slowly reheating the substrate between coats. Blistering and pealing were virtually eliminated when the substrate was held at 24° C. and the sol bath was at an elevated temperature. The FT-IR spectra of coatings deposited by negative thermogradients are not the same as the FT-IR spectrum of an as-cast gel, although it is not clear why. Each coating produced by thermophoresis was about 30 microns in thickness and had uniformly dispersed particles.

Example 4:

Substrate materials, such as, fecralloy, glass, aluminum and steel were heated to temperatures ranging from room temperature to 400° F. and dipped into an aluminum hydroxide sol as prepared in Example 1 containing 20% by weight dispersed silicon carbide whiskers. The temperature of the sol was varied from about 0° C. to about 100° C.

The applied thermal gradient caused whiskers and sol to adhere to the substrate. Each coating ranging in thickness from about 30 to about 80 microns and four coatings were applied to each substrate. Following each coating the samples were dried in air at ambient or slightly elevated temperature.

Having now fully described the invention, it will be apparent to one of ordinary skill in the art that many changes and modifications can be made thereto without departing from the spirit or scope of the invention as set forth herein.

What is claimed is:

1. A method of thermophoretically depositing a ceramic coating onto a substrate, comprising the steps of:
   (a) hydrolyzing and peptizing a metal oxide precursor in an aqueous medium in the presence of an acidic peptizing agent at a temperature and for a time effective to produce a sol having a colloid particle size of between about 0.0005 and about 10 microns, said aqueous medium having a pH of between about 0.01 and about 7 comprising a member selected from the group consisting of water and a mixture of water and an organic solvent having a water:solvent ratio of between 10,000:1 and 2:1, and said metal oxide precursor being selected from the group consisting of aluminum, silicon, hafnium, lanthanum, titanium, magnesium, thorium, uranium, tantalum, germanium, and zirconium alkoxides, organo orthosilicates and mixtures thereof;
   (b) partially dewatering said sol by reducing the volume of water in said sol to between 10 weight % and about 90 weight %;
   (c) depositing particles from said partially dewatered sol onto the surface of a substrate, said substrate and said so being maintained at a temperature differential of between about 10° C. and about 1500° C., thereby producing a coated substrate; and then
   (d) drying said coated substrate.

2. A method of claim 1, wherein said substrate and said sol are maintained at a temperature differential of between about 100° C. and about 300° C.

3. A method of claim 1, wherein particles from said partially dewatered sol are deposited onto the surface of a substrate by immersing said substrate into said sol for a period of time effective to deposit a desired coating thickness and then removing the coated substrate from the sol.

4. A method of claim 1, wherein particles from said partially dewatered sol are deposited onto the surface of said substrate by spraying the partially dewatered sol onto the surface of said substrate.

5. The method of claim 1, wherein a reinforcement material is present in the sol in the form of a powder, shavings, fibers, colloids, platelets, whiskers, fines, ultrafines or mixtures thereof.

6. The method of claim 5, wherein the reinforcement material is selected from the group consisting of metal oxides, metal carbides, metal nitrides, silicon nitride, glass, carbons, metal powders and mixtures thereof.

7. A method of thermophoretically depositing a ceramic coating onto a substrate, comprising the steps of:
   (a) hydrolyzing and peptizing a metal oxide precursor in an aqueous medium in the presence of an acidic peptizing agent at a temperature and for a time effective to produce a sol having a colloid particle size of between about 0.0005 and about 10 microns, said aqueous medium having a pH of between about 4 and about 5 comprising a member selected from the group consisting of water and a mixture of water and an organic solvent having a water:solvent ratio of between 10,000:1 and 2:1, and said metal oxide precursor being selected from the group consisting of aluminum, silicon, hafnium, lanthanum, titanium, magnesium, thorium, uranium, tantalum, germanium, and zirconium alkoxides, organo orthosilicates and mixtures thereof;
(b) partially dewatering said sol by reducing the volume of water in said sol to between 10 weight % and about 90 weight %;
(c) depositing particles from said partially dewatered sol onto the surface of a substrate, said substrate and said sol being maintained at a temperature differential of between about 10° C. and about 1500° C., thereby producing a coated substrate; and then
(d) drying said coated substrate.

8. A method of thermophoretically depositing a ceramic coating onto a substrate, comprising the steps of:
(a) hydrolyzing and peptizing a metal oxide precursor in an aqueous medium in the presence of an acidic peptizing agent at a temperature and for a time effective to produce a sol having a colloid particle size of between about 0.0005 and about 10 microns, said aqueous medium having a pH of about between 0.01 and about 7 and comprising a member selected from the group consisting of water and a mixture of water and an organic solvent having a water:solvent ratio of between about 10,000:1 and 2:1, said metal oxide precursor being selected from the group consisting of aluminum, silicon, hafnium, lanthanum, titanium, magnesium, thorium, uranium, tantalum, germanium and zirconium alkoxides, organo orthosilicates and mixtures thereof;
(b) partially dewatering said sol by reducing the volume of water in said sol to between about 10 weight % and about 90 weight %;
(c) establishing a temperature differential between a substrate and said partially dewatered sol;
(d) depositing particles from said partially dewatered sol onto the surface of said substrate, said substrate and said sol being maintained at a temperature differential of between about 10° C. and about 1500° C., thereby producing a coated substrate; and then
(e) drying said coated substrate.

* * * * *